Patented June 17, 1952

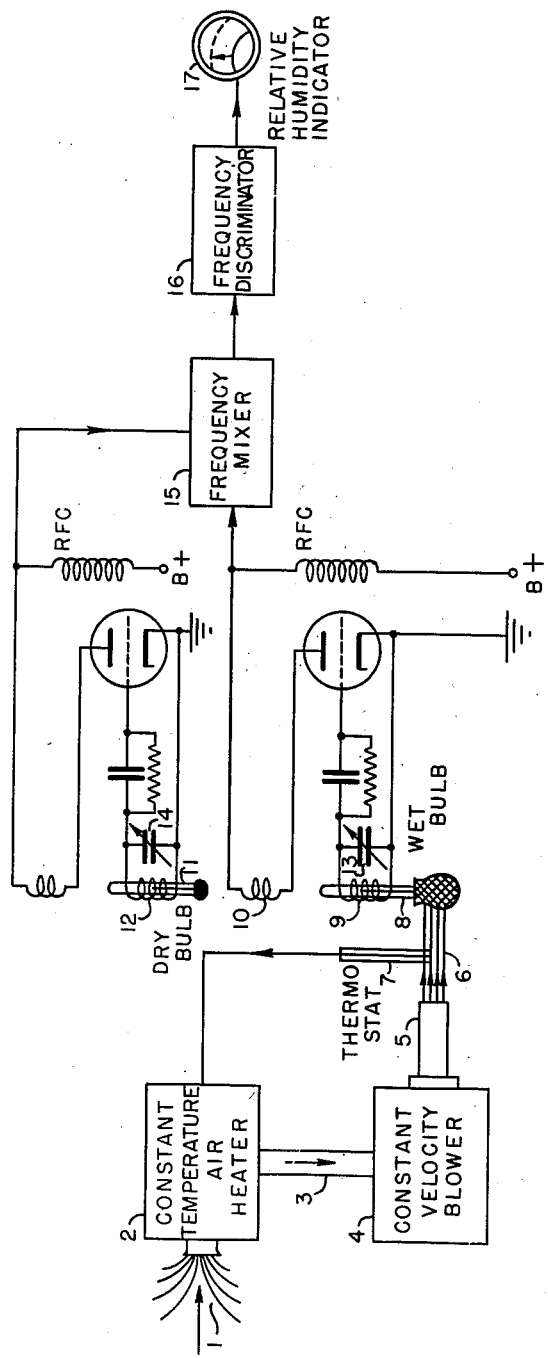

2,600,396

UNITED STATES PATENT OFFICE 2,600,396

ELECTRONIC PSYCHROMETER

Harold I. Ewen, United States Navy

Application March 4, 1947, Serial No. 732,366

5 Claims. (Cl. 73—338)

(Granted under the act of March 3, 1883, as amended April 30, 1928; 370 O. G. 757)

This invention relates generally to electronic hygrometers, and more particularly to an electronic psychrometer adapted to provide a sensitive and direct indication of relative humidity.

It is well known in the art that one definition of relative humidity is the ratio of the quantity of water vapor in the air to that quantity which would saturate the air at the existing temperature. Similarly, relative humidity is also the ratio of the pressure or quantity of water vapor present in the air to the pressure or quantity of saturated water vapor at the existing temperature.

In the conventional psychrometer method of measuring relative humidity, a dry bulb thermometer is used to measure air temperature and hence indicates the quantity or pressure of water vapor required to saturate the air. A wet bulb thermometer will indicate the amount of water vapor presently in the air. Since the temperature drop required to produce saturation from a given moisture content is different for every dry bulb temperature reading, separate calculations of relative humidity must be made for every possible combination of temperature readings. This is an awkward means of computing relative humidity and is not easily adapted to automatic calculation.

It is an object of this invention to provide a system for producing a direct indication of relative humidity.

It is another object of this invention to provide a simple electronic system for automatically determining relative humidity.

It is another object of this invention to provide a novel method of determining relative humidity, and apparatus for carrying out the same.

It is another object of this invention to provide an electrical circuit suitable for use as a psychrometer and the like.

Other objects and features of this invention will be apparent from the following descriptions and accompanying drawing, in which the single figure portrays an embodiment of this invention in schematic diagram representing standard elements by blocks.

Briefly, this invention provides a simple and direct indication of relative humidity by generating first and second signal frequencies proportional, respectively, to the logarithm of the water vapor pressure actually present in the air and the logarithm of the saturated water vapor pressure of the air and thereafter indicating relative humidity as a function of the frequency difference of said first and second frequencies.

In the preferred embodiment of the invention the first and second signal frequencies are generated by separate oscillators whose frequencies of operation are held responsive, respectively, to the action of wet and dry bulb thermometers. The wet bulb thermometer is arranged to determine the absolute quantity of moisture in the air without reference to the existing air temperature by preheating the air measured by said thermometer to a fixed temperature. The oscillator circuit controlled by the wet bulb thermometer is made to change its frequency in a logarithmic function of the vapor pressure presently in the air. The dry bulb thermometer is arranged to determine the saturated water vapor pressure and the oscillator circuit it controls is arranged to shift frequency as a logarithmic function of the saturated vapor pressure. Thereafter the two signal frequencies are heterodyned to produce a frequency difference which is equivalent to the ratio of the water vapor actually present in the air to the water vapor pressure of saturated air, or in other words, the relative humidity.

Referring now to the drawing in detail, air is drawn into the intake 1 of a constant temperature air heater 2. The air is then drawn through a suitable conduit for air 3 into a constant velocity blower 4. The suction provided by said blower may be used to draw the air into the heater 2 as well as through the pipe 3 to blower 4. The output orifice 5 of said blower is suitably arranged to direct a stream of the heated air 6 at a fixed temperature upon a suitable controlling device such as a thermostat 7 and upon a wet bulb thermometer 8. Then, since the wet bulb thermometer 8 is subjected to a flow of air at fixed temperature, the reading of the thermometer 8 will be directly proportional to the quantity or pressure of water vapor presently in the air. Said thermostat is tied to the constant temperature air heater 2 to provide a controlling means for maintaining a fixed air temperature, such as 80° Fahrenheit. A relatively high temperature is preferable to a lower one because it produces greater variations at the wet bulb thermometer.

Said wet bulb thermometer 8 is used, as herein illustrated, as the core of a tuning coil in any suitable type of oscillator circuit as described and claimed in my copending application, Serial No. 732,365, filed March 4, 1947, for "Mercurial Column Controlled Inductance" and now U. S. Patent No. 2,491,486. As here shown, it is axially inserted in the grid coil 9 of a regenerative oscillator, it being understood that other known types of frequency control could be used if desired. Said grid coil 9 is logarithmically wound so that the change of inductance produced by a change in the height of the fluid column of the thermometer will vary logarithmically with said change in fluid column. The oscillation frequency of the circuit will then vary logarithmically with the temperature of the thermometer bulb. The thermometer should be inserted in such manner that the top of the fluid column will always be within the coil.

A dry bulb thermometer 11, reading the normal unheated temperature of the air, is similarly inserted in a logarithmically wound coil 12 of another oscillator circuit. Said second oscillator circuit may be identical to said first oscillator circuit. As shown in the drawing, each thermometer containing coil, 9 and 12, is shunted by a variable capacitor, 13 and 14. By this or other tuning means, the operating frequency band of the oscillators may be selected. Signals from each of said oscillators are beat together in any suitable mixing device 15 such as a multigrid vacuum tube amplifier circuit. The output frequency of said mixer 15 is the difference frequency between said thermometer controlled oscillators and is a logarithmic representation of the relative humidity in accordance with the ratio definition previously discussed. Said mixer output frequency is then detected, such as by a frequency discriminator circuit 16. Said discriminator circuit will have a direct current output varying in magnitude directly with said beat frequency. This direct current may be applied to an indicating device such as a meter 17 having a logarithmic scale calibrated in terms of relative humidity.

Although only limited and specific embodiments of this invention have been herein disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. An electrical psychrometer comprising wet and dry bulb thermometers, a first means including an oscillator operative to change its frequency as a logarithmic function of the height of the fluid column of the dry bulb thermometer, a second means including a second oscillator operative to change its frequency as a logarithmic function of the height of the fluid column of the wet bulb thermometer, detecting means fed by said first and second means operative to detect the difference between the respective frequencies thereof, and indicating means operative to indicate said difference frequency in terms of relative humidity.

2. An electrical psychrometer comprising wet and dry bulb thermometers, a first means including an oscillator operative to change its frequency as a logarithmic function of the height of the fluid column of the dry bulb thermometer, a second means including a second oscillator operative to change its frequency as a logarithmic function of the height of the fluid column of the wet bulb thermometer, heterodyning means operative to produce the frequency difference between said first and second oscillator, and indicating means operative responsive to said frequency difference to indicate relative humidity.

3. An electronic psychrometer comprising, a first oscillator, a wet bulb thermometer the fluid column of which is operatively arranged with said oscillator to logarithmically control the frequency thereof, a second oscillator, a dry bulb thermometer the fluid column of which is operative to vary logarithmically the frequency of said second oscillator, blower means including an air heater adapted to subject said wet bulb thermometer to a specimen of atmosphere at a predetermined temperature, detecting means fed by said first and second oscillators operative to detect the frequency difference therebetween, and indicating means operative to indicate said difference frequency in terms of relative humidity.

4. An electronic psychrometer comprising, a first oscillator, a wet bulb thermometer operatively associated with said oscillator to logarithmically vary the frequency of said oscillator with the height of its fluid column, a second oscillator similar to said first oscillator, a dry bulb thermometer operatively associated with said second oscillator to vary logarithmically the frequency of said second oscillator with the height of its fluid column, blower means including an air heater adapted to subject said wet bulb thermometer to a specimen of atmosphere at a predetermined temperature and velocity, heterodyning means operative to produce a frequency difference between said first and second oscillators, and indicating means responsive to said frequency difference for indicating relative humidity.

5. An electronic psychrometer comprising, a first oscillator, a wet bulb thermometer operatively associated with said oscillator to logarithmically vary the frequency of said oscillator with the height of its fluid column, a second oscillator similar to said first oscillator, a dry bulb thermometer operatively associated with said second oscillator to vary logarithmically the frequency of said second oscillator with the height of its fluid column, blower means including an air heater adapted to subject said wet bulb thermometer to a specimen of atmosphere at a predetermined temperature and velocity, heterodyning means operative to produce a frequency difference between said first and second oscillators, and indicating means including a frequency discriminator responsive to said frequency difference for indicating relative humidity.

HAROLD I. EWEN.

REFERENCES CITED

The following references are of record in the file of this patent:

UNITED STATES PATENTS

| Number | Name | Date |
|---|---|---|
| 1,951,276 | Edwards et al. | Mar. 13, 1934 |
| 2,011,710 | Davis | Aug. 20, 1935 |
| 2,315,756 | Warner | Apr. 6, 1943 |
| 2,412,782 | Palmer | Dec. 17, 1946 |
| 2,536,111 | Van Dyke | Jan. 2, 1951 |

FOREIGN PATENTS

| Number | Country | Date |
|---|---|---|
| 11,125 | Great Britain | May 2, 1912 |